United States Patent [19]
Kirby et al.

[11] 3,896,898
[45] July 29, 1975

[54] HIGH FREQUENCY SEISMIC SOURCE USING COMPRESSED AIR

[75] Inventors: Robert Andrew Kirby; Joseph Frank Bayhi, both of Houston, Tex.

[73] Assignee: Exxon Production Research Company, Houston, Tex.

[22] Filed: June 6, 1973

[21] Appl. No.: 367,672

[52] U.S. Cl.................. 181/120; 181/115; 340/7 R
[51] Int. Cl............................................. G01v 1/02
[58] Field of Search ............ 181/.5 A, .5 H, .5 VM, 181/115, 120, 114

[56] References Cited
UNITED STATES PATENTS

| | | | |
|---|---|---|---|
| 3,177,466 | 4/1965 | Arnoldi............................. | 181/.5 A |
| 3,437,170 | 4/1969 | Brock et al. ........................ | 181/120 |
| 3,711,824 | 1/1973 | Farron .............................. | 181/.5 H |
| 3,799,285 | 3/1974 | Kirby............................... | 181/.5 NC |

*Primary Examiner*—Maynard R. Wilbur
*Assistant Examiner*—H. A. Birmiel

[57] ABSTRACT

The invention is a seismic source using compressed gas such as air as the source of energy. The compressed gas is stored in a reservoir and is quickly released into a multiplicity of elongated conduits extending from the reservoir to beneath the surface of a liquid medium such as the ocean. The exhausts or open ends of the tubes are arranged in an areal pattern. The diameter of the tubes preferably is between 0.5 and 5.0 centimeters and the length of the tubes or conduits is between 0.5 and 5.0 meters. Preferably, the tubes are of the same length so that the compressed air is released into the liquid medium concomitantly from all of the conduits.

3 Claims, 4 Drawing Figures

HIGH FREQUENCY SEISMIC SOURCE USING COMPRESSED AIR

BACKGROUND OF THE INVENTION

This invention relates to seismic sources and more particularly to seismic sources wherein seismic energy is produced by the release of compressed air into a liquid medium.

Prior to 1967 it was customary to produce seismic energy at water covered locations of the earth by detonating dynamite in the water. For ecological and safety reasons, the use of dynamite has fallen into disfavor in recent years. Various seismic sources, such as gas exploders, electric arc generators, and so-called "air guns" have become widely used. Both gas exploders and electric arc generators can be used to produce high frequency seismic energy, but air gun type seismic sources have generally been restricted to seismic frequencies of 25 Hertz or less. One reason for this is that air guns of sufficient size to generate the seismic energy needed for purposes of geophysical exploration are quite large and produce low frequency energy. Small air guns produce high frequency energy but not of sufficient strength for seismic exploration purposes. Theoretically, it should be possible to use a multiplicity of air guns but in practice it has been found virtually impossible to synchronize the operation of the shuttles in the air guns to within 5 milliseconds. As a result, even by using a multiplicity of small air guns, relatively low frequency energy is produced since the composite pulse is predominantly of low frequency. Since it is desirable to use high frequency seismic energy to more exactly delineate earth formations, the use of air guns has not found favor for this application.

SUMMARY OF THE INVENTION

The present invention is directed to a system for producing seismic energy in a liquid medium including means for compressing gas to a high pressure in a reservoir and valve means for quickly releasing the gas from the reservoir. A plurality of elongated conduit means connected to said reservoir and said valve means conducts high pressure gas from the valve means to beneath the surface of the liquid medium. Preferably the elongated conduit means are substantially equal in length so that compressed air is concomitantly released from the open ends of all of the conduits to synchronize the seismic pulses produced thereby. Preferably also the exhaust ends of the conduit means are areally disposed beneath the surface of the liquid medium. The conduit means may be of different diameters to shape the spectrum of the composite pulse.

Objects and features of the invention not apparent from the above discussion will become evident upon consideration of the following detailed description thereof considered in connection with the accompanying drawings.

DETAILED DESCRIPTION OF AN EMBODIMENT OF THE INVENTION

Figure 1:
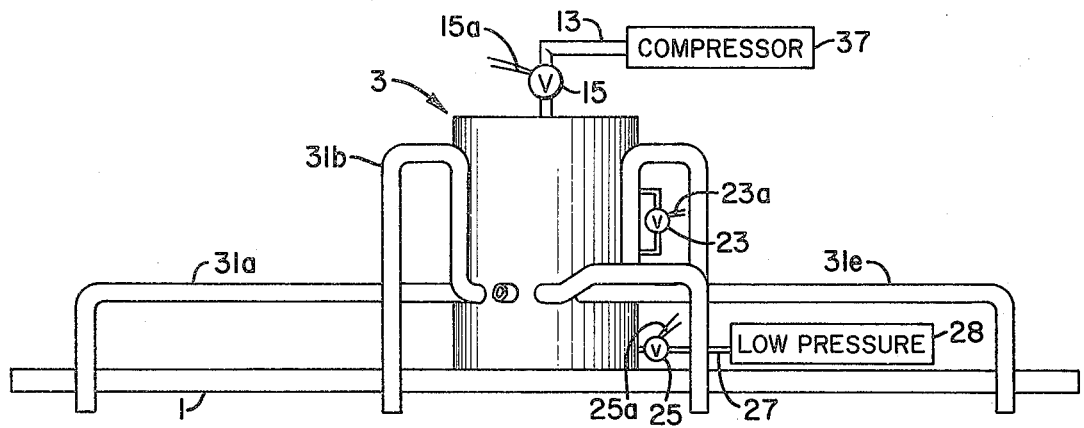
FIG. 1 is a schematic representation of apparatus for carrying out the invention.

In FIG. 1 there is illustrated a valve and reservoir member 3 supported on a platform 1. The platform 1 may be supported near the water's surface by large air tanks in a catamaran fashion, or may be suspended or towed beneath the water's surface. A source of high pressure gas, such as an air compressor 37 which may be aboard a ship, is connected to the upper reservoir portion of member 3 by means of a high pressure line 13 controlled by an electromagnetically actuated valve 15. A source of low pressure gas 28, which may be a pressure regulator attached to the source of high pressure gas, also is connected to member 3. Electrical leads 15a are provided for the purpose of providing electrical energy to actuate valve 15.

Figure 2:
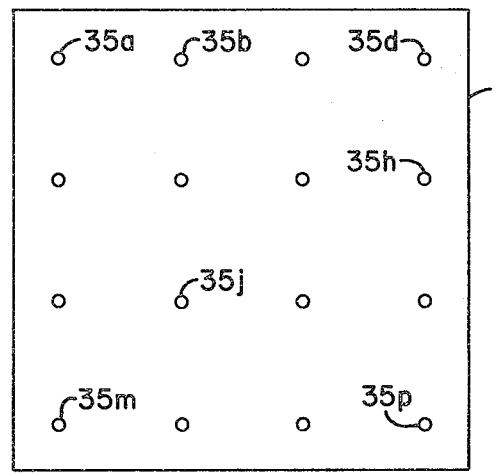
FIG. 2 is an areal bottom view of the apparatus of FIG. 1.

A plurality of conduits 31a, 31b . . . 31p are connected to the reservoir valve and valve member 3 and extend therefrom through the platform 1 to beneath the water's surface. As illustrated most perspicuously in FIG. 2, the conduits extend through openings 35a, 35b . . . 35p which are areally disposed over the platform 1. Preferably, the inner diameters of the conduits are between 0.5 and 5.0 centimeters.

Figure 3A:
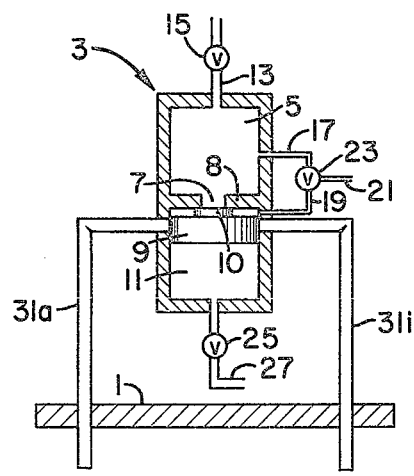
FIGS. 3A and 3B are schematic views of the valve and reservoir 3 of FIG. 1 showing the component parts in two of the operative positions thereof.
Figure 3B:
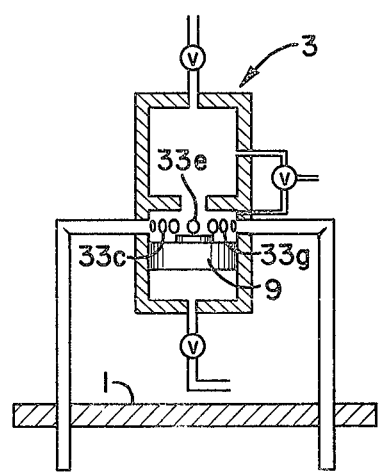

As best illustrated in FIGS. 3A and 3B, the reservoir and valve member 3 comprise a housing which is divided into an upper high pressure chamber 5 and a lower or low pressure chamber 11. An orifice plate or partition 8 divides the interior of the housing means and a port or orifice 7 therein provides fluid communication between the chambers 5 and 11. The conduit 13 leading from the high pressure source or compressor 37 opens into the chamber 5. The conduit 27 controlled by valve 25 (electromagnetically actuated from electrical leads 25a) leading to a low pressure source 28 opens into the low pressure chamber 11. A piston 9 having a sealing member 10, which may be of the nature of an O-ring or a flat rubber disc, seals around the opening port or orifice 7 and provides a small gap between the upper surface of the piston 9 and the lower surface of the plate or partition 8. A conduit 17 extends from the interior of chamber 5 to valve 23 (electromagnetically actuated from electrical leads 23a) and a conduit 19 extends from the upper end of the chamber 11 to valve 23. Line 21 leading from the valve opens to the atmosphere. In one position of valve 23 conduits 17 and 19 are interconnected and conduit 21 is sealed off. In the other position thereof conduit 19 is vented to the atmosphere through conduit 21 and conduit 17 is sealed off.

The operation of the apparatus described above is as follows: Initially, valves 15 and 25 are closed and valve 23 is open so that chamber 5 and the upper portion of chamber 11 are at atmospheric pressure. Valve 23 is now closed and valve 25 is opened forcing piston 9 to the upper limit of its movement so that sealing member 10 closes port 7. Valve 15 is now opened. High pressure air from source 37 pressurizes the upper chamber 5. The total force exerted on the bottom of the piston by the low pressure air in the lower portion of chamber 11 must be greater than the total force exerted by the high pressure air on the cross sectional area of the orifice or port 7 on the sealing member 10. Any air leakage around the piston 9 or the piston seal 10 is continually exhausted to the atmosphere through valve 23. The system is now armed and ready to fire. To fire the system, valves 15 and 25 are closed and valve 23 is actuated so that conduit 17 is placed in fluid communication with conduit 19. The high pressure chamber 5 is now in fluid communication with the space between the piston 9 and the plate or partition 8. This upsets the balance of force on the piston and causes the piston to start moving downwardly. The downward movement of the piston opens orifice 7 and causes the piston 9 to rapidly accelerate. The downward travel of the piston simultaneously uncovers the many small exhaust ports 33a . . . 33p as is illustrated in FIG. 3B (only ports 33c, 33e, and 33g are referenced). The high pressure air within chamber 5 is thus exhausted into the water in an areal pattern through the conduits 31a . . . 31p. A multiplicity of air bubbles are generated by the exhausting of the high pressure air into the water to form high frequency seismic energy pulses. Since the pulses occur concomitantly they will add together to produce a single high energy, high frequency pulse.

While the member 1 is illustrated as a solid member, it is feasible and in certain areas may be desirable to fabricate it from steel bars in an open latticework. This is particularly true when the member 1 is to operate submerged as the energy released into the water may be sufficient to damage a solid member and cause the entire system to be rendered inoperative.

In order to reduce the effect of the undesirable bubble pulse which is inherent in all air gun systems, the individual air conduits in the array can be of different cross sectional areas. The initial compressional waves generated by the discharge of air through the individual conduits will occur simultaneously and will add algebraically to form the desired signal. However, if the conduits are of different cross sectional areas, the volume of air discharged through each conduit will vary. The size or volume of the resultant air bubbles formed in the water will therefore be of various magnitudes. These bubbles will collapse at different times dependent upon their individual sizes. The resultant bubble pulses will be distributed over a time interval and will not reinforce each other.

We claim:

1. A system for producing seismic energy in a liquid medium including means for compressing gas in a reservoir to a high pressure and valve means for quickly releasing the gas from the reservoir into said liquid medium, the improvement comprising a plurality of elongated conduit means of substantially equal length connected to a common valve means for conducting pressurized gas from said common valve means into said liquid medium and wherein the inner diameters of the plurality of conduit means are of a plurality of different magnitudes.

2. The apparatus of claim 1 wherein the inner diameters of the conduit means are between 0.5 and 5.0 centimeters.

3. The apparatus of claim 1 wherein the exhaust ends of said conduit means are areally disposed beneath the surface of the liquid medium.

* * * * *